(12) United States Patent
Lindmark et al.

(10) Patent No.: US 10,098,458 B2
(45) Date of Patent: Oct. 16, 2018

(54) PALLET STATION

(71) Applicant: INTER IKEA SYSTEMS B.V., Delft (NL)

(72) Inventors: Mikael Lindmark, Osby (SE); Allan Dickner, Älmhult (SE)

(73) Assignee: INTER IKEA SYSTEMS B.V., Delft (NL)

( * ) Notice: Subject to any disclaimer, the term of this patent is extended or adjusted under 35 U.S.C. 154(b) by 0 days.

(21) Appl. No.: 15/116,154

(22) PCT Filed: Feb. 20, 2014

(86) PCT No.: PCT/EP2014/053276
§ 371 (c)(1),
(2) Date: Aug. 2, 2016

(87) PCT Pub. No.: WO2015/124184
PCT Pub. Date: Aug. 27, 2015

(65) Prior Publication Data
US 2017/0164740 A1 Jun. 15, 2017

(51) Int. Cl.
| B65D 19/00 | (2006.01) |
| B65D 19/30 | (2006.01) |
| A47B 96/02 | (2006.01) |
| A47B 47/00 | (2006.01) |
| A47F 5/00  | (2006.01) |

(52) U.S. Cl.
CPC ........ *A47B 96/024* (2013.01); *A47B 47/0083* (2013.01); *A47B 96/021* (2013.01); *A47F 5/0018* (2013.01); *B65D 19/0097* (2013.01); B65D 2519/00273 (2013.01); B65D 2519/00293 (2013.01); B65D 2519/00323 (2013.01); B65D 2519/00572 (2013.01)

(58) Field of Classification Search
CPC .............. A47B 47/0083; A47F 5/0018; B65D 19/0097
USPC ............................................. 108/57.14, 55.1
See application file for complete search history.

(56) References Cited

U.S. PATENT DOCUMENTS

| 2,674,431 A   | 4/1954 | Attwood |
| 3,463,325 A * | 8/1969 | Rogers ................... A47B 57/00 211/187 |

(Continued)

FOREIGN PATENT DOCUMENTS

| CN | 2113664 U | 8/1995 |
| CN | 2248001 Y | 2/1997 |

(Continued)

OTHER PUBLICATIONS

International Search Report for No. PCT/EP2014/053276, dated Oct. 29, 2014.

(Continued)

*Primary Examiner* — Kimberley S Wright
(74) *Attorney, Agent, or Firm* — Merchant & Gould P.C.

(57) ABSTRACT

The present invention concerns a pallet station (1). The pallet station (1) comprises a storage surface in the form of a shelf (5). The shelf (5) is received on support beams (4) arranged between transversal beams (3). Support rails (6) are attached to the shelf (5) by means of hook elements (14, 16). The hook elements (14, 16) used for attaching the support rails (6) are beam hooks (14) and/or net hooks (16).

15 Claims, 3 Drawing Sheets

(56) References Cited

U.S. PATENT DOCUMENTS

| | | | | |
|---|---|---|---|---|
| 3,695,456 A | * | 10/1972 | Lewis | A47B 57/402 |
| | | | | 211/191 |
| 3,986,462 A | * | 10/1976 | Heft | A47B 96/02 |
| | | | | 108/188 |
| 4,048,059 A | * | 9/1977 | Evans | A47B 96/024 |
| | | | | 108/155 |
| 4,056,195 A | * | 11/1977 | Keith | A47F 5/00 |
| | | | | 108/55.1 |
| 4,729,483 A | | 3/1988 | Schrader | |
| 4,762,237 A | | 8/1988 | Newton | |
| 4,955,490 A | * | 9/1990 | Schafer | A47B 96/02 |
| | | | | 211/187 |
| 5,052,307 A | | 10/1991 | Morrison | |
| 5,779,069 A | * | 7/1998 | Scully | A47B 96/02 |
| | | | | 211/153 |
| 6,105,512 A | * | 8/2000 | Lin | B65D 19/0073 |
| | | | | 108/55.5 |
| 6,132,158 A | | 10/2000 | Pfeiffer et al. | |
| 6,173,846 B1 | * | 1/2001 | Anderson | A47B 47/027 |
| | | | | 211/183 |
| 7,007,815 B2 | * | 3/2006 | Anderson | A47F 5/01 |
| | | | | 211/183 |
| 7,406,920 B2 | | 8/2008 | Scholz | |
| 7,810,438 B2 | * | 10/2010 | Ryberg | A47B 96/024 |
| | | | | 108/42 |
| 7,891,507 B2 | * | 2/2011 | Shetler | A47B 47/02 |
| | | | | 211/135 |
| 8,267,263 B2 | * | 9/2012 | Hamby | B65D 19/40 |
| | | | | 108/57.33 |
| 9,027,767 B2 | * | 5/2015 | Buckley | A47F 5/00 |
| | | | | 211/134 |
| 9,215,931 B1 | * | 12/2015 | Offerman | A47B 96/021 |
| 9,375,102 B2 | * | 6/2016 | Troyner | |
| 9,386,855 B2 | * | 7/2016 | Sabounjian | A47B 96/14 |
| 2002/0064441 A1 | | 5/2002 | Lowrey et al. | |
| 2004/0238470 A1 | * | 12/2004 | Wishart | A47B 47/027 |
| | | | | 211/189 |
| 2005/0188903 A1 | * | 9/2005 | Ryberg | A47B 96/024 |
| | | | | 108/149 |
| 2009/0229498 A1 | * | 9/2009 | Hamby | B65D 19/40 |
| | | | | 108/57.33 |
| 2010/0219146 A1 | * | 9/2010 | Hamby | A47B 47/021 |
| | | | | 211/134 |
| 2014/0116973 A1 | * | 5/2014 | Buckley | A47F 5/00 |
| | | | | 211/134 |
| 2015/0090683 A1 | * | 4/2015 | Sabounjian | A47B 96/14 |
| | | | | 211/186 |
| 2016/0362250 A1 | * | 12/2016 | Duppong | B65G 1/02 |

FOREIGN PATENT DOCUMENTS

| | | |
|---|---|---|
| DE | 20106030 U1 | 6/2001 |
| EP | 0321099 A1 | 6/1989 |
| EP | 1559346 A1 | 8/2005 |
| RU | 2271130 C2 | 3/2006 |
| WO | WO 2010/080539 A1 | 7/2010 |

OTHER PUBLICATIONS

Office Action for Russian Patent Application No. 2016134931/11(054576), dated Dec. 6, 2017.

Office Action for Chinese Patent Application No. 201480075992.2, dated Jul. 4, 2017.

* cited by examiner

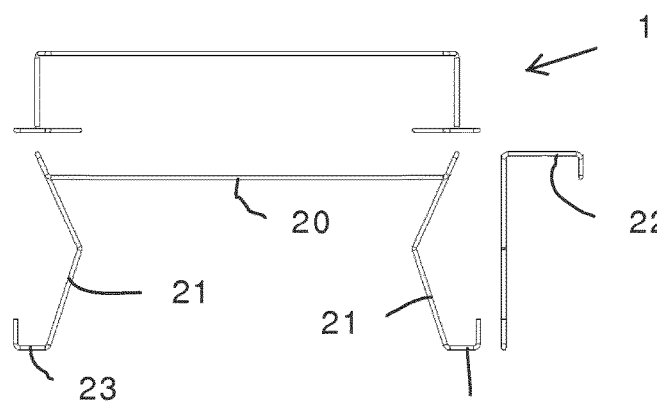
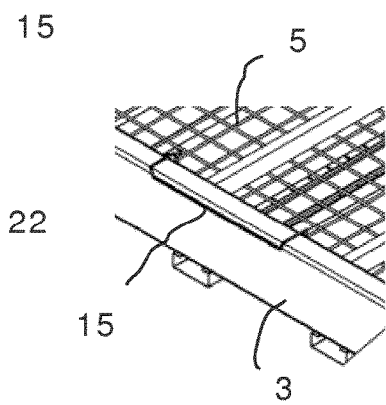
Fig. 10          Fig. 11
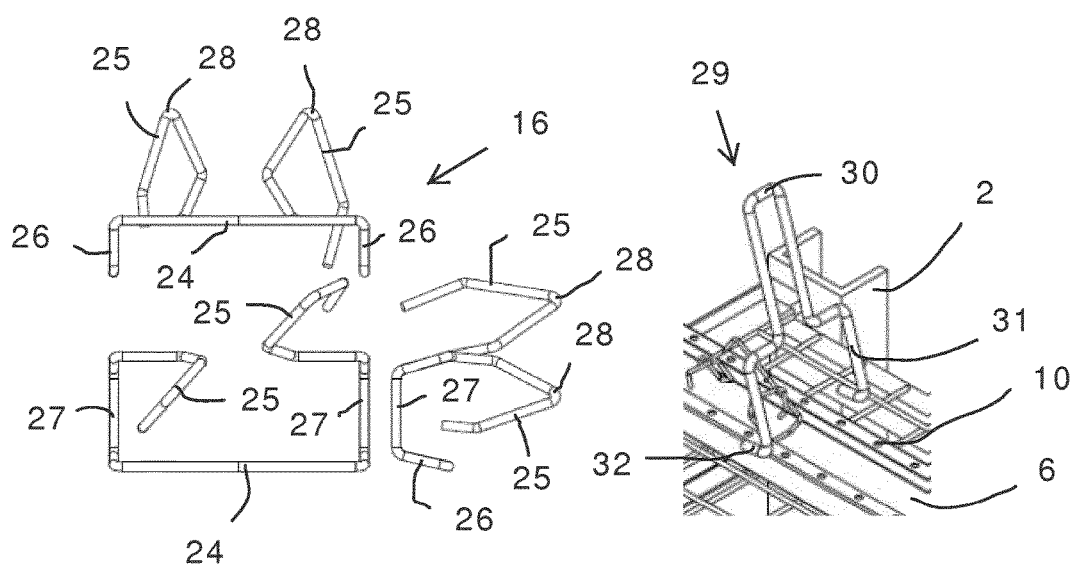
Fig. 12          Fig. 13

PALLET STATION

This application is a National Stage Application of PCT/EP2014/053276, filed 20 Feb. 2014, which application is incorporated herein by reference. To the extent appropriate, a claim of priority is made to the above disclosed application.

TECHNICAL FIELD

The present invention concerns a pallet station normally forming a part of a storage rack. It is mainly directed to releasable fastening of support rails on a shelf of the pallet station.

BACKGROUND

In many stores there are storage racks for self-picking, i.e. the customers are to pick-up goods to be bought directly from the storage rack. Often the customers may only pick-up goods from lower levels, while the storage rack as such may have several higher levels. In some instances the goods to be placed in the storage rack is placed on some kind of load carrier, such as loading ledges or different kinds of pallets. The load carriers are normally received on some kind of support rails on the shelves. In other instances the goods is placed directly on the shelf, without any load carrier. For goods not placed on load carriers the support rails are normally to be removed, as they may damage the goods in that they protrude above the shelf as such.

For safety reasons the shelves of a storage rack are often made in the form of nets. By using nets the shelves will not unnecessarily hinder for instance water from sprinklers. Thus, using nets is positive in view of fire-safety. The nets will also hinder parts from dropping through. Furthermore, there should be means to hinder that the storage rack falls down when people are placing or picking gods onto or from the rack.

SUMMARY

The invention is directed to a pallet station having a shelf, on which shelf support rails are to be attached. The pallet station is often one of several similar stations forming a storage rack.

Even though the present invention has been developed for use in storage racks, a person skilled in the art realises that it can be used also for other purposes. One example is a display surface in a store.

The support rails are to receive loading ledges, pallets etc. Furthermore, the support rails are to be attached to the shelf of the pallet station in such a way that they are released, if exposed to extensive forces.

Depending on the goods to be received on the pallet station the support rails may or may not be needed. Thus, it is beneficial if the support rails can be mounted and dismounted in a relatively easy and quick way. Thereby, the pallet station can be adapted to the actual need at any given time. The support rails may be mounted releasable on only lower levels of a support rack formed of several pallet stations. In some instances the support rails at higher levels are also mounted in a releasable way. In this context lower level is under about 1.80 m.

In the description below the shelves are shown as having the form of nets, but a person skilled in the art realizes that the shelves can have any form as long as they have openings for receiving the hook elements used for attaching support rails. For ease of description the shelves are shown as nets here. Nets are normally the preferred form of the shelves.

Further objects and advantages of the present invention will be obvious to a person skilled in the art reading the detailed description below.

BRIEF DESCRIPTION OF THE DRAWINGS

The invention will be described further below by way of examples and with reference to the enclosed drawings. In the drawings:

FIG. 10 shows views in different directions of a net fastener, FIG. 11 is a detailed view from below, illustrating mounting of the net fastener of FIG. 10, FIG. 12 shows views in different directions of a net hook, and FIG. 13 is a detailed view from above, indicating mounting of the net hook of FIG. 12 to the support rail and a tool to be used in mounting of the support rail.

DETAILED DESCRIPTION

As used in this description the expressions "horizontal", "vertical" and similar expressions are in view of the normal use of the parts described, and as normally shown in the enclosed drawings.

Figure 1:
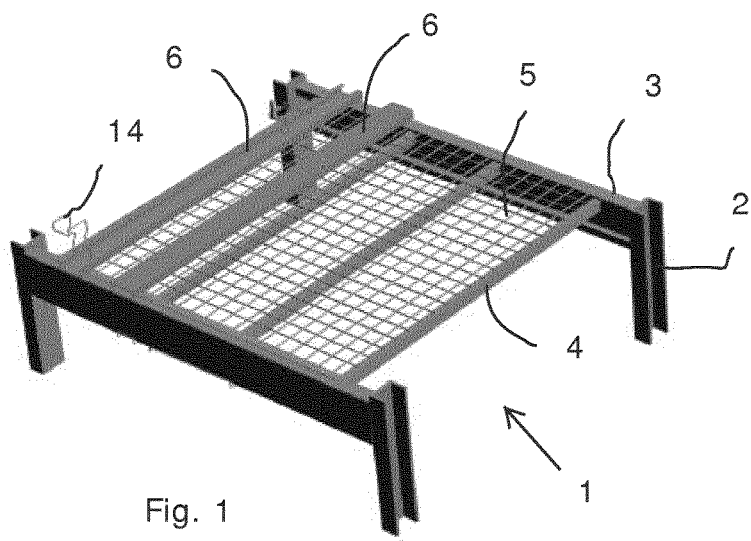
FIG. 1 is a schematic, perspective view of a pallet station according to the present invention.

In FIG. 1 a pallet station 1 is shown. The pallet station 1 is a part of a storage rack. It comprises vertical struts 2, transversal beams 3, support beams 4 and shelves 5. The vertical struts 2 are connected to each other by means of the transversal beams 3, which transversal beams 3 are placed in parallel with each other. The support beams 4 are placed in parallel with each other between the transversal beams 3. The shelves 5 have the form of one or more nets, which nets are placed on the support beams 4. A storage rack has normally a number of pallet stations 1 placed side by side and placed above one and another, in which case the vertical struts 2 and transversal beams 3 each extend along a number of pallet stations 1.

On top of the shelves 5 support rails 6 are placed. In FIG. 1 one support rail 6 is shown upside down and one support rail 6 is shown mounted, for illustrative purpose. The support rails 6 are to receive feet of pallets, loading ledges or the like. The support rails 6 are placed at a distance from each other corresponding with the distance between the feet of pallets, loading ledges or the like. Each support rail 6 has a straight elongated main part 7. Two side parts 8 are placed at opposite sides of the main part 7, whereby each side part 8 is perpendicular to the main part 7 of the support rail 6. A horizontal flange 9 is placed perpendicular to each side part 8 at the side of the side part 8 distant from the main part 7. Thus, the horizontal flanges 9 are parallel with the main part 7. The horizontal flanges 9 are directed toward each other with an open space between them. There are rows of through openings 10 on each horizontal flange 9. In the shown embodiment one row of openings 10 is placed a short distance from one end of each horizontal flange 9 and one row of openings 10 is placed at a longer distance from the other end of said horizontal flange 13. In other embodiments there are openings 10 along the total length of each support rail 6. When mounted the support rails 6 are to be placed on top of the net forming the shelf 5, with the horizontal flanges 9 facing the shelf 5.

Figure 2:
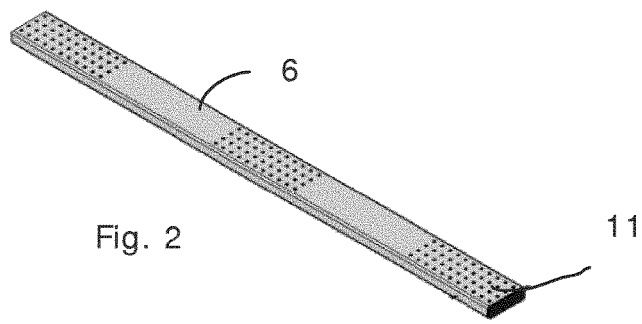
FIG. 2 is a perspective view of a first embodiment of a support rail to be used in the pallet station.
Figure 3:
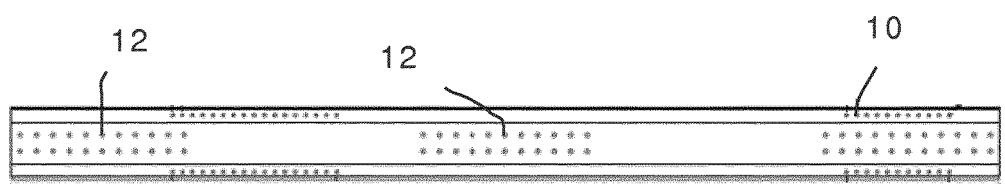
FIG. 3 is a plan view of a lower side of the support rail of FIG. 2.
Figure 4:
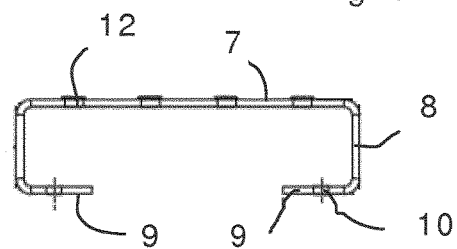
FIG. 4 is an end view of the support rail of FIGS. 2 and 3.

On the side of the main part 7 of the support rail 6 to be facing away from the shelf 5, there are one or more friction areas 11. In the embodiment of FIG. 2 there are three friction areas 11, formed of a number of through openings 12. The through openings 12 are punched or bored from below to give a raised surface around respective opening 12 on the upper side of the main part 7. A person skilled in the art realises that the friction areas 11 may be formed in different ways. Other examples include forming each friction area as an embossing in roll forming of the support rail 6 or adhering friction material 13 to the support rail by means of a suitable adhesive. The purpose of the friction areas 11 is to reduce the risk that goods placed on the support rails 6 will glide.

Figure 5:
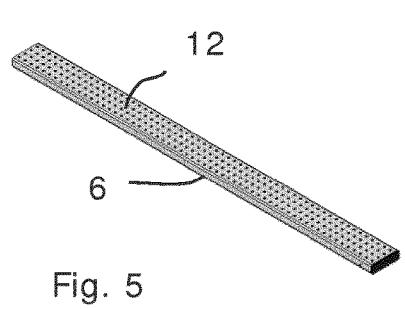
FIG. 5 is a perspective view of a second embodiment of the support rail.
Figure 6:
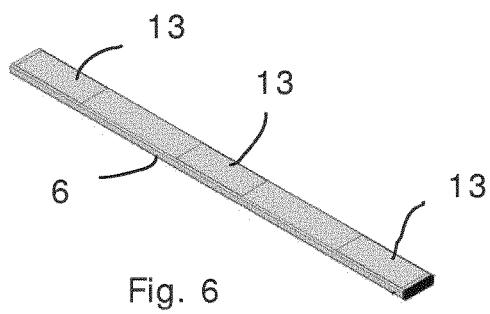
FIG. 6 is a perspective view of a third embodiment of the support rail.
Figure 7:
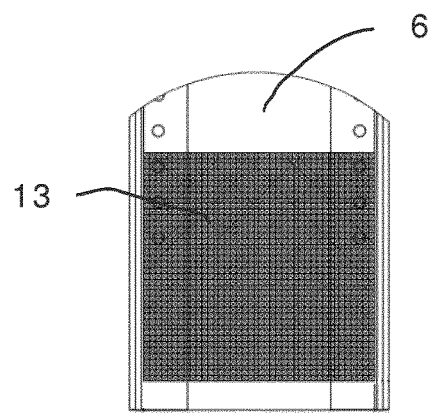
FIG. 7 is a detailed view of a part of the support rail of FIG. 6.
Figure 8:
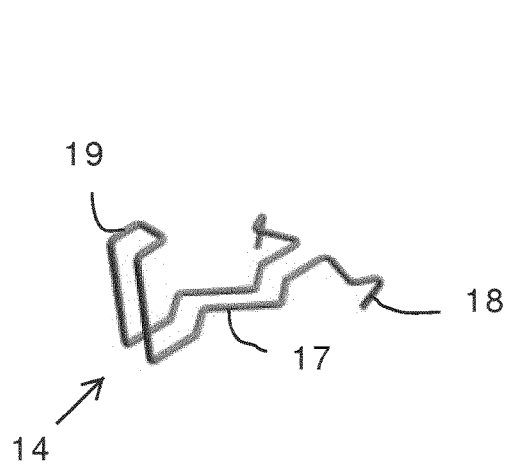
FIG. 8 is a perspective view of a beam hook to be used in the pallet station.

In the embodiment of FIG. 5 the through openings 12 are placed along the total length of the support rail 6 and not just in three areas. The support rail 6 of FIG. 6 has three areas of friction material 13 attached to the support rail 6. In FIG. 7 one area of friction material 13 is shown.

The support rails 6 are mounted to respective shelf by means of beam hooks 14 and/or net hooks 16. The beam hooks 14 are to be placed gripping around a transversal beam 3 and is therefore normally to be placed at the ends of the support rail 6 to be mounted. The net hooks 16 may be placed anywhere along the support rail 6 were there are openings 10 in the horizontal flanges 9 of the support rail 6. It is possible to use only beam hooks 14, only net hooks 16 or a combination of beam hooks 14 and net hooks 16 for the mounting of the support rails 6. The nets forming the shelf 5 may be mounted by means of special net fasteners 15 and/or by means of the beam hooks 14 used for mounting of the support rails 6.

Figure 9:
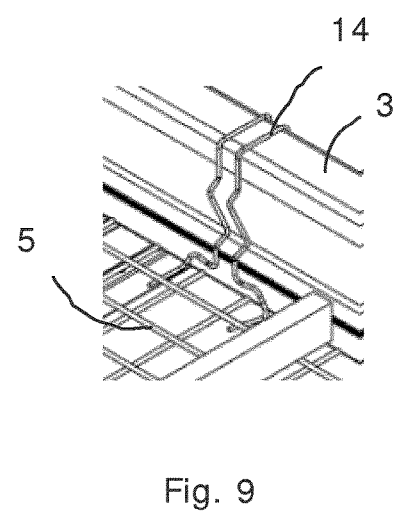
FIG. 9 is a detailed view from below, indicating mounting of the beam hook of FIG. 8.

Each beam hook 14 has two leg parts 17 and each leg part has a bent end 18 at the free end. The leg parts 17 are given a wave form, to have a kind of spring function. The angles and size of said wave form will influence the load that can be taken up by the beam hook 14. In FIG. 9 the beam hook 14 is shown not connected to a support rail 6 for illustrative purpose. The bent end 18 of each leg part 17 is to be placed in one opening 10 of the horizontal flange 9 of the support rail 6. The two leg parts 17 of the beam hook 14 are placed in corresponding openings 10 in the horizontal flanges 9 of a support rail 6 placed opposite each other. The beam hook 14 has further a hook part 19 at an end opposite the ends of the leg parts 17 to be received in the openings 10 of the horizontal flanges 9. The hook part 19 of respective beam hook 14 is to be placed around one of the transversal beams 3 and has a dimension adapted to the thickness of the transversal beam 3. The leg part 17 of the beam hook 14 is to be placed on the inside of the transversal beam 3, i.e. the same side as the net forming the shelf 5. In mounting of a support rail 6 by means of beam hooks 14, the bent ends 18 of the leg parts 17 of the beam hook 14 is first placed in openings 10 of the horizontal flange 9 of the support rail 6. The leg parts 17 are inserted from below, first through the net and then the bent ends 18 are inserted from below into the openings 10 of the horizontal flanges 9. The beam hook 14 is then turned to be placed around an adjacent transversal beam 3, whereby the bent ends 18 of the leg parts 17 will be placed abutting the horizontal flanges 9 of the support rail 6. The leg parts 17 of the beam hook 14 are bent in such a way that they will follow the profile of the transversal beam 3. The support rail 6 will be held in place by means of the bent ends 18 of the leg parts 17 abutting the horizontal flanges 9 and the hook part 19 received around the transversal beam 3. The beam hooks 14 will also hold the shelf 5 in place. To facilitate loosening of a beam hook 14, the hook part 19 may have a raised portion (not shown) for receiving a tool, by which tool the hook part 19 is bent away from the transversal beam 3.

Each net fastener 15 has a central part 20 and two legs 21 at opposite ends of the central part 20. Between the central part 20 and respective leg 21, a hook part 22 is formed, which hook part 22 is to be received at the bottom of one of the transversal beams 3. At the free ends of respective leg 21 a hook 23 is formed, which hook 23 is to grip the net. The legs 21 are to be placed on the inside of the transversal beam 3, i.e. the same side as the net. In use the legs 21 of the net fastener 15 is inserted from below through openings in the net, in such a way that the hooks 23 of the legs 21 will grip the net. Thereafter the hook part 22 is placed around the transversal beam 3.

The net hooks 16 are used for mounting of the support rail 6 to the nets forming the shelf 5. Each net hook 16 has a central part 24, which central part 24 goes over into a vertical part 26 at each end of the central part 24. The vertical parts 26 are perpendicular to the central part 24, and are parallel extending in the same direction. Each vertical part 26 goes over into a horizontal part 27, which horizontal parts 27 normally are in parallel with the central part 24. After each horizontal part 27 a leg part 25 is formed. Each leg part is bent to form an apex 28, which apex 28 is to be inserted through an opening in the net forming the shelf 5. The parts forming the apex 28 diverge from each other to a maximal distance, which maximal distance exceeds the dimension of an opening in the net. In use free ends of the leg parts 25 are received in one opening 10 of one respective horizontal flange 9 of the support rail 6. When attaching a net hook 16 to a support rail 6, the support rail 6 is first turned with the side to be facing the shelf 5 facing upwards. The leg parts 25 of the net hook 16 are then inserted in one opening 10 of a horizontal flange 9 each. The central part 24 is received under respective horizontal flange 9, spanning the distance between the horizontal flanges 9. The parts forming the apex 28 of each net hook 16 are flexible enough to be pressed through the openings of the net. In mounting of the support rail 6 by means of the net hooks 16, the net hooks 16 are first mounted to the support rail 6. Then the support rail 6 is placed on top of the shelf 5, whereby the leg parts 25 of the net hooks 16 are pressed down through openings of the net forming the shelf 5. The leg parts 25 will expand again after passing of the net, whereby the support rail 6 is held at the net. By amending the angles by which the leg parts of the net hook 16 are bent, the force that can be taken up by said net hook 16 will vary.

The beam hooks 14, the net fasteners 15 and the net hooks 16 are normally made of one single metal thread each. The dimensions of the beam hooks 14, net fasteners 15 and net hooks 16 are adapted to the dimensions of the parts they are to be attached to. The actual sizes of beams and nets often vary between different storage racks. The dimension of the beams may vary both in height and in depth.

A special tool (not shown) may be used when mounting the net hook 16 in the openings 10 of the support rail 6. The special tool has one part with a longitudinal slit to grip one of the leg parts 25 of the net hook 16. A handle is attached to the gripping part of the tool. In use a first end of the net hook 16 is first placed in an opening 10 of one flange 9 of the support rail 6. The gripping part of the tool is then placed on the leg part 25 of the net hook 16 relatively close to a second end of the net hook 16. There after the net hook 16 is swung under the opposite flange 9 by means of the tool. Finally the second end of the net hook 16 is placed in an opening 10 of said opposite flange 9.

Due to the relatively large distance it may be difficult to press down the net hook 16 only by manual force. A tool 29, shown in FIG. 13, may be used in mounting of the support rail 6 by means of a net hook 16 to the net. The tool 29 may be made by one thread. The tool has a handle 30 at one end, which handle 30 is transformed into two legs 31 at an opposite end. At the free end of each leg 31 a hook 32 is formed, which hook 32 is perpendicular to the leg 31. The hooks 32 at the free ends of the legs 31 are to grip around threads of the net. In use the support rail 6 is placed on the net with at least one net hook 16 attached to the support rail 6. The apexes 28 of the at least one net hook 16 is placed in openings of the net, with the parts forming each apex 28 resting on the net. The tool 29 is placed above the support rail 6, close to the position of the at least one net hook 16, with the hooks 32 of the legs 31 gripping the net. Then the net hooks 16 are pressed down into the net, by turning the tool 29 around the hooks 32 gripping the net, whereby the tool 29 will press on the upper side of the support rail 6. Often there is only access to the storage rack 1 from one side, in which case there may be a relatively large distance from the side of a shelf 5 to a net hook 16 to be pressed down into the net. The tool 26 for mounting the support rails 6 by means of the net hooks 16 may be combined with the special tool described above, for mounting the net hooks 16 in the openings 10 of the support rail 6.

As indicated above a support rail 6 may be mounted by means of only beam hooks 14, only net hooks 16 or a combination of beam hooks 14 and net hooks 16. The beam hooks 14 can take up larger forces than the net hooks 16. Therefore, the choice of which types of hooks to use can depend on the forces that may be charged onto the support rail 6.

For safety reasons the beam hooks 14 and/or net hooks 16 holding the support rails 6 should come loose if the support rail 6 is exposed to a certain minimal force. For the beam hooks 14, one way of guaranteeing the safety demands is to dent the thread of the leg parts 17 adjacent to the hook part 19 to be placed around a transversal beam 3. If the support rails 6 are exposed to excessive forces, the beam hooks 14 will break at the dents. For the net hooks 16, one way of guaranteeing the safety demands is to adapt the size and bending of the leg parts 25 to the sizes of the openings of the net, receiving the net hooks 16.

The invention claimed is:

1. A pallet station comprising a storage surface in the form of a shelf,
   wherein the shelf is received on support beams arranged between transversal beams, and further comprising support rails attached to the shelf by means of hook elements,
   wherein the shelf has a form of a net,
   wherein each of the support rails comprises a main part with side parts at opposite sides of the main part, which side parts are placed perpendicular to the main part, wherein one horizontal flange is placed perpendicular to respective side part at the side of the side part opposite the side at the horizontal flange, and wherein the horizontal flanges of each support rail are placed in a common plane and directed toward each other and with a distance between each other,
   wherein each of the horizontal flanges has at least one row of through openings and wherein each of the support rails is connected to the one or more nets by means of beam hooks and/or net hooks,
   wherein each beam hook comprises two leg parts, wherein each leg part has a bent end, and a hook part at the end of the leg parts opposite the bent ends, wherein each leg part has a wave form.

2. The pallet station of claim 1, wherein angles and size of the wave form of the leg parts of the beam hook will be varied to influence the load that can be taken up by the beam hook.

3. The pallet station of claim 1, wherein the bent end of each leg part is received in one opening of the horizontal flange of the support rail and wherein the hook part of each beam hook is placed around one of the transversal beams.

4. The pallet station of claim 1, wherein each net hook has a central part and leg parts to be inserted in openings of the net and wherein the leg parts have a dimension larger than the openings of the net but are flexible enough to be pressed through the openings.

5. The pallet station of claim 4, wherein each net hook is received with a first end in one opening in the at least one row of openings of one horizontal flange of the support rail and with a second end in one opening in the row of openings of the other horizontal flange of the support rail and wherein the net hook is placed abutting the surfaces facing each other of the main part and respective horizontal flange of the support rail.

6. The pallet station of claim 1, wherein the one or more nets forming the shelf is held in place by means of the net hooks and/or net fasteners.

7. The pallet station of claim 6, wherein each net fastener comprises a central part, two legs, at opposite ends of the central part, a hook, at the free ends of the legs, and a hook part, formed between the central part and the legs and wherein the hook of the legs of each net fastener is gripping a net and the hook part of each net fastener is placed around a transversal beam.

8. The pallet station of claim 1, wherein the beam hook, the net fastener and the net hook, respectively, are each formed of one single thread bent to the desired form.

9. The pallet station of claim 8, wherein the beam hook, the net fastener and the net hook are given means to release a mounted net and/or support rail if the net or support rail is exerted to a predetermined force.

10. The pallet station of claim 9, wherein the size of the predetermined force is adjusted by varying curved parts of the legs and leg parts of the net fastener, beam hook and net hook, respectively.

11. The pallet station of claim 9, wherein the predetermined force is given by dents in the thread forming the beam hook, the net fastener and/or net hook, respectively.

12. The pallet station of claim 1, wherein each support rail is furnished with one or more friction areas.

13. The pallet station of claim 12, wherein the friction areas are given by through openings and/or friction surfaces.

14. The pallet station of claim 7, wherein it comprises a tool for mounting a part of a support rail by means of a net hook, wherein the tool comprises a handle at one end, two legs at an opposite end and a hook at a free end of each leg and wherein each hook is perpendicular to the adjacent leg.

15. The pallet station of claim 1, wherein the storage surface is part of a storage rack.

\* \* \* \* \*